Figure 1:
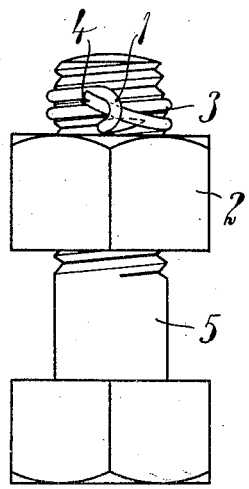

Sept. 14, 1926.　　　　　J. G. ELMÉR ET AL　　　　　1,599,995
LOCK NUT
Filed April 21, 1924

Inventors
Johan G. Elmér
Harald Fernström
Carl G. Nök
By　　　　　Atty.

Patented Sept. 14, 1926.

1,599,995

UNITED STATES PATENT OFFICE.

JOHAN GUSTAF ELMÉR, OF ESKILSTUNA, HARALD FERNSTRÖM, OF SKOGSTORP, AND CARL GUSTAF HÖK, OF ESKILSTUNA, SWEDEN.

LOCK NUT.

Application filed April 21, 1924, Serial No. 707,984, and in Sweden April 26, 1923.

This invention relates to an improved lock nut of the kind consisting of a wire of steel or other resilient material wound into a cylindrical spiral corresponding to the threads of the screw.

If a cylindrical spiral with cross-cut ends is used as a lock nut above a usual nut it will be found that it has a very small locking power even if it closely fits to the threads of the screw-bolt in as much as the main nut on loosening exerts a stress on the lower end of the spiral spring in such direction that it tends to expand the spiral whereby the locking power by which the spiral spring is secured to the threads is essentially reduced.

It has also been proposed to provide an extension at the upper end of the spiral which is bent downwards and brought into engagement with a boring in the main nut to be locked. If the main nut shows a tendency to get loose the nut effects by said extension a tightening of the upper windings of the spiral so that the locking power of the spiral is increased. A lock nut of said construction is however difficult to use in as much as the main nut must be provided with a boring and the position of said boring must correspond to the position of the downwardly bent upper end of the spiral when the lock nut has been screwed on and, furthermore, the rather great length of the downwardly bent extension causes that only a rather small tightening stress can be transmitted to the upper end of the spiral.

The object of this invention is to provide a lock nut consisting of a cylindrical spiral spring which can effect a very reliable locking without that any special arrangements at the main nut are needed and without that it will be necessary to bring the ends of the spiral into any distinct position in relation to the nut.

With this and other objects in view the invention consists, chiefly, in providing an extension at one or both ends of the spiral which extension is bent in such manner that it bears against the first winding at the opposite end of the spiral. The lock nut is screwed onto the bolt above the main nut to be locked in such manner that the said bent extension is jammed between the lowermost winding of spiral and the upper side of the main nut.

If the main nut shows a tendency to get loose on account of shakes and the like, the nut acts by friction on the said bent end of the spiral, so that the upper windings of the spiral are tightened the more strongly the greater is the tendency of the nut to get loose.

In some cases we prefer to enclose the cylindrical spiral spring into a sleeve having a bottom flange adapted to bear against the main nut to be locked as will be more specifically described herebelow.

Figure 3:
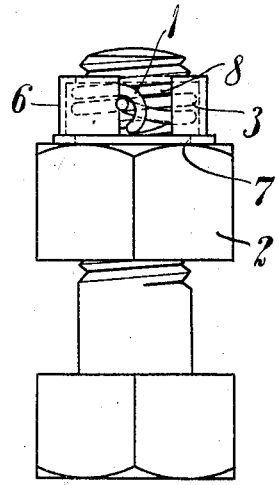
Figure 2:
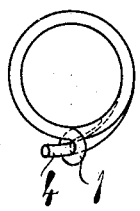
Figure 4:
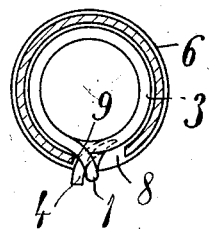
Figure 5:

In the accompanying drawing we have shown several embodiments of our invenspiral. Fig. 3 shows screw bolt having a lock nut consisting of a cylindrical spiral spring in direct contact with the main nut. Fig. 2 is a corresponding top view of the spiral. Fig. 3 shows screw bolt having a lock nut consisting of a cylindrical spiral spring enclosed by a sleeve which engages the main nut. Fig. 4 shows a corresponding top view of the spiral with the sleeve in section. Fig. 5 shows a side view and Fig. 6 a top view of a modification of the lock nut.

Referring now to Fig. 1 and 2, 5 is a screw bolt with a main nut 2 and a lock nut 3, the latter consisting of a cylindrical spiral spring closely fitting to the threads of the bolt. The upper end of said spiral has an extension 1 which is bent downwards so that it lies below the lower end 4 of the spiral which latter for that purpose is bent somewhat upwards as shown in Fig. 1. When the lock nut is screwed up on the bolt the end of the extension 1 bears thus against the upper side of the nut 2. If the main nut 2 shows a tendency to get loose it carries with it by friction the extension 1 of the spiral so that the upper windings of the spiral are drawn in to a tighter engagement with the threads of the bolt whereby the locking of the nut is secured. Experience has shown that this locking is effective up to the limit for the strength of the material and that a rather thin hardened steel wire is sufficient for such locking up to the limit for the strength of the bolt and the main nut.

In the embodiment shown in Figs. 3 and 4 the spiral spring 3 is enclosed by a sleeve 6 which bears against the upper side of the main nut 2, the extension 1 of the upper end of the spiral being bent in such manner that it bears against the bottom flange 7 of the sleeve. The sleeve 6 has an opening 8 for leaving room for the bent ends 1 and 4. If the main nut 2 shows a tendency to get loose on the bolt 5 it carries with it the sleeve 6 by friction and the latter actuates then the extension 1 partly by the friction between the flange 7 and the end of the extension 1 and partly by that the rear edge 9 of the opening 8 presses directly against the extension 1 so that the upper windings of the spiral are drawn tighter into the threads of the bolt the greater is the tendency of the nut to get loose.

Figure 6:

In the modification shown in Figs. 5 and 6 both ends of the spiral have identical extensions 1ª and 1ᵇ which are twisted together or loosely interlocked and bent in such manner that each of them bears with its end on the opposite end winding of the spiral as clearly shown in Fig. 5. By this symmetrical arrangement of the extensions of the spiral ends the locking effect aimed at is reached independently of whether the one or other end of the spiral is turned towards the main nut, thus avoiding the possibility that the lock nut is accidentally applied in an ineffective manner.

It will thus be seen that while the extensions are loosely interlocked so that either can be moved peripherally with respect to the other sufficiently to permit a tightening of the spiral, that extension which is in frictional engagement with the nut may be moved slightly by the nut in loosening.

At the same time the extension lying against the nut is moved in the axial direction so that its end which is bevelled and lies under the spiral turn that is adjacent the nut, is crowded against the side of the thread for additional frictional retardation.

This axial movement of the extension is also transmitted to the extension with which it interlocks, and its end, likewise, is crowded into frictional engagement with the thread of the bolt.

It will be noted that the ends of the extension are bevelled and lie under the outer turns of the spring wire and sufficiently close to them to prevent these bevelled ends from being forced out the groove in the bolt and caused to jump over the threads. At the same time these extensions are not so close to the end turns of the spiral as to prevent the extensions from moving by the frictional engagement with the nut.

We claim—

1. A lock nut comprising a spiral of resilient material having turns adapted to fit to the grooves of a thread and an outer end crossing the spiral turns outside the spiral and bent to frictionally engage any portion of the end face of the nut to tighten the spiral when the nut loosens.

2. A lock nut comprising a spiral of resilient material having an extension of its outer turn crossing the spiral and bent to frictionally engage any portion of the end face of the nut, and the end of such extension bent to lie in the thread of the bolt carrying the first turn of such spiral to tighten the spiral when the nut loosens.

3. A lock nut comprising a spiral of resilient material having an extension of its inner and outer turns both crossing the spiral and bent to frictionally engage the end face of a nut, either of which extensions may engage such end face.

4. A lock nut comprising a spiral of resilient material having an extension on its ends crossing the spiral and bent to frictionally engage the end face of a nut and the ends of such extensions bent to engage the thread in which the extreme turns of the spirals lie.

5. A lock nut comprising a spiral of spring wire having turns adapted to fit to the grooves of the thread and extensions of its ends crossing the spiral turns outside the spiral and loosely interlocked, said extensions bent to frictionally engage the end face of a nut.

6. A lock nut comprising a spiral of spring wire having extensions on its ends crossing the spiral and bent to frictionally engage a nut, said extensions loosely interlocked and having their ends extending in the grooves of the thread in which the end turns of the spiral lie.

7. A lock nut comprising a spiral of spring wire having extensions on its ends crossing the spiral and bent to loosely interlock, the ends of such extensions bevelled and lying under the outer turns of the spiral.

8. A lock nut comprising a sleeve having an opening in its side and a flange at one end, in combination with a resilient spiral in said sleeve, having an extension on its outer end passing through said opening, whereby when flange and sleeve are moved by the loosening of the nut, the edge of said opening will engage said extension to tighten the spiral.

9. A lock nut comprising a sleeve having a longitudinal slot and a flange at one end, in combination with a spiral of spring wire in said sleeve, having extensions on its ends crossed and passing through said slot, whereby when sleeve and flange are frictionally moved by the loosening of the nut an edge of said extension will engage the extension on the outer end of the spiral and tighten it.

In testimony whereof we have signed our names.

JOHAN GUSTAF ELMÉR.
HARALD FERNSTRÖM.
CARL GUSTAF HÖK.